(12) United States Patent
Xu et al.

(10) Patent No.: US 10,726,244 B2
(45) Date of Patent: Jul. 28, 2020

(54) METHOD AND APPARATUS DETECTING A TARGET

(71) Applicant: Samsung Electronics Co., Ltd., Suwon-si (KR)

(72) Inventors: Jingtao Xu, Beijing (CN); Biao Wang, Beijing (CN); Yaozu An, Beijing (CN); ByungIn Yoo, Seoul (KR); Changkyu Choi, Seongnam-si (KR); Deheng Qian, Beijing (CN); Jae-Joon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 15/833,224

(22) Filed: Dec. 6, 2017

(65) Prior Publication Data
US 2018/0157899 A1  Jun. 7, 2018

(30) Foreign Application Priority Data

Dec. 7, 2016 (CN) .......................... 2016 1 1118710
Nov. 13, 2017 (KR) ....................... 10-2017-0150501

(51) Int. Cl.
*G06K 9/00* (2006.01)
*G06K 9/46* (2006.01)
(Continued)

(52) U.S. Cl.
CPC ..... *G06K 9/00288* (2013.01); *G06K 9/00899* (2013.01); *G06K 9/036* (2013.01);
(Continued)

(58) Field of Classification Search
None
See application file for complete search history.

(56) References Cited

U.S. PATENT DOCUMENTS 7,024,033 B2 * 4/2006 Li ...................... G06K 9/00228
382/118
8,098,906 B2    1/2012 Shuckers et al.
(Continued)

FOREIGN PATENT DOCUMENTS

EP    2 639 731 A2    9/2013
EP    2 854 105 A1    4/2015
(Continued)

OTHER PUBLICATIONS

Saad, Michele A. et al. "Blind Image Quality Assessment: A Natural Scene Statistics Approach in The DCT Domain." *IEEE transactions on Image Processing*, vol. 21, Issue 8, 2012, (pp. 3339-3352).
(Continued)

*Primary Examiner* — Fayyaz Alam
(74) *Attorney, Agent, or Firm* — NSIP Law

(57) ABSTRACT

A method of detecting a target includes determining a quality type of a target image captured using a camera, determining a convolutional neural network of a quality type corresponding to the quality type of the target image in a database comprising convolutional neural networks, determining a detection value of the target image based on the convolutional neural network of the corresponding quality type, and determining whether a target in the target image is a true target based on the detection value of the target image.

33 Claims, 10 Drawing Sheets

(51) Int. Cl.
*G06N 3/08* (2006.01)
*G06K 9/66* (2006.01)
*G06K 9/03* (2006.01)
*G06N 3/04* (2006.01)

(52) U.S. Cl.
CPC ............ *G06K 9/4628* (2013.01); *G06K 9/66* (2013.01); *G06N 3/0454* (2013.01); *G06N 3/08* (2013.01)

(56) References Cited

U.S. PATENT DOCUMENTS

| | | |
|---|---|---|
| 8,364,971 B2 | 1/2013 | Bell et al. |
| 9,117,109 B2 | 8/2015 | Nechyba et al. |
| 9,384,404 B2 | 7/2016 | Chen et al. |
| 9,430,709 B2 | 8/2016 | Juveneton et al. |
| 2010/0054550 A1 | 3/2010 | Okada |
| 2013/0243272 A1* | 9/2013 | Hanzawa ............... G06F 21/32 382/118 |
| 2014/0270404 A1 | 9/2014 | Hanna et al. |
| 2015/0324629 A1 | 11/2015 | Kim et al. |
| 2015/0347833 A1 | 12/2015 | Robinson et al. |
| 2016/0019421 A1 | 1/2016 | Feng et al. |
| 2016/0034901 A1 | 2/2016 | Ferren |
| 2016/0117544 A1 | 4/2016 | Hoyos et al. |
| 2016/0140390 A1 | 5/2016 | Ghosh et al. |
| 2016/0205096 A1 | 7/2016 | Hoyos et al. |
| 2016/0217338 A1* | 7/2016 | Li ..................... G06K 9/00711 |
| 2017/0124385 A1* | 5/2017 | Ganong ............ G06K 9/00677 |
| 2019/0026544 A1* | 1/2019 | Hua ...................... G06T 7/194 |
| 2019/0220652 A1* | 7/2019 | Li ........................ G06F 21/32 |

FOREIGN PATENT DOCUMENTS

| | | |
|---|---|---|
| JP | 2011-141740 A | 7/2011 |
| WO | WO 2016/149881 A1 | 9/2016 |

OTHER PUBLICATIONS

Wen, Di, et al. "Face Spoof Detection with Image Distortion Analysis." *IEEE Transactions on Information Forensics and Security*, Issue 10, Issue 4, 2015, (pp. 746-761).
European Search Report dated Jun. 4, 2018 in corresponding European Patent Application No. 1720598.0 (11 pages in English).
Galbally, Javier, et al. "A High Performance Fingerprint Liveness Detection Method Based On Quality Related Features." *Future Generation Computer Systems*, vol. 28 Issue 1, 2012, (pp. 311-321).
Saad, Michele A. et al. "Blind Image Quality Assagsment: A Natural Scene Statistics Approach in The DCT Domain." *IEEE transactions on Image Processing*, vol. 21, Issue 8, 2012, (pp. 3339-3352).
Galbally, Javier, et al. "image Quality Assessment for Fake Biometric Detection: Application to Iris, Fingerprint, and Face Recognition." *IEEE Transactions on Image Processing*, vol. 23, Issue 2, 2014 (pp. 710-724).
Wen, Di, et al. "Face Spoof Detection with Image Distortion Analysis," *IEEE Transactions on Information Forensics and Security*, vol. 10, Issue 4, 2015, (pp. 746-761).
Dutta, Abhishek, et al. "Predicting Face Recognition Performance Using Image Quality." arXiv preprint arXiv:1510.07119, Oct. 24, 2015 (pp. 1-14).
European Search Report dated Jun. 4, 2018 in corresponding European Patent Application No. 17205980.0 (11 pages in English).

\* cited by examiner

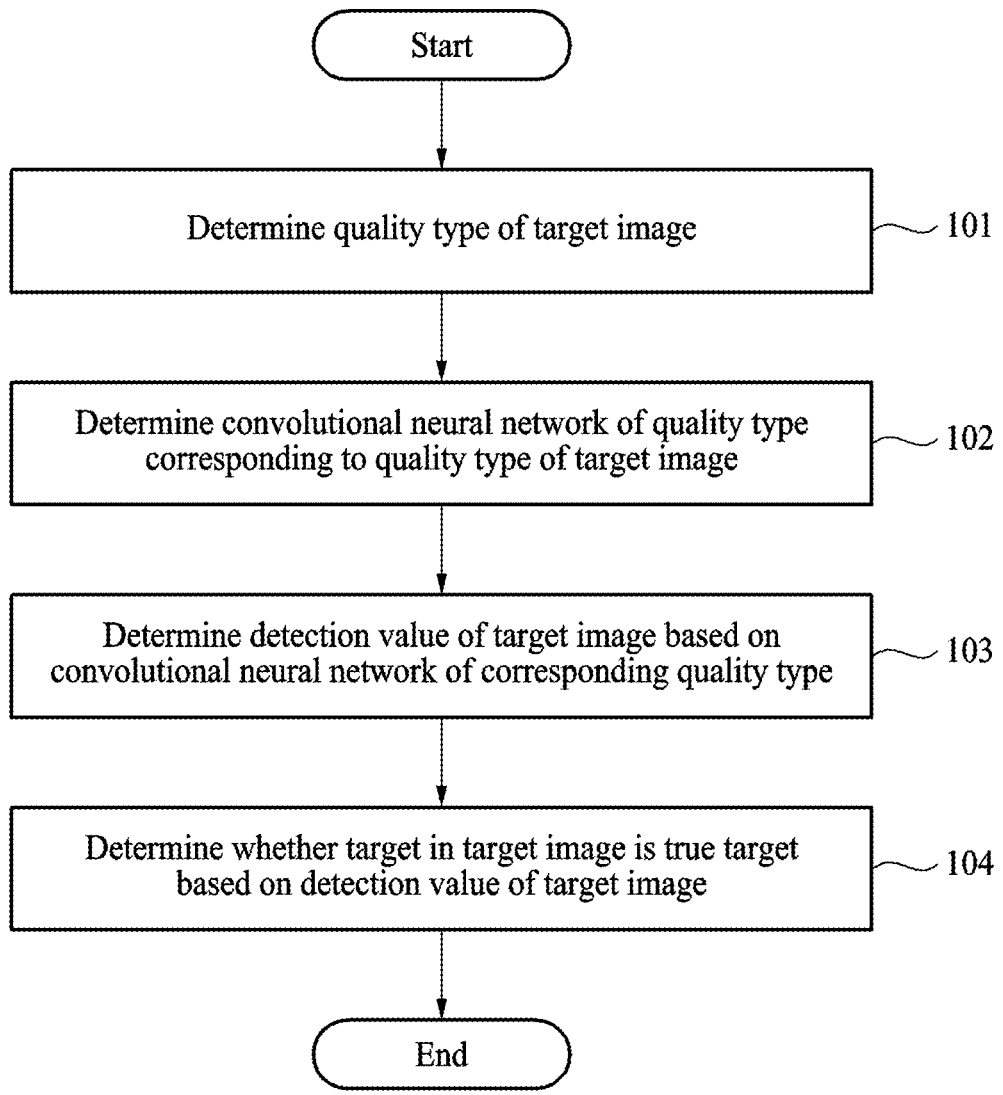

METHOD AND APPARATUS DETECTING A TARGET

CROSS-REFERENCE TO RELATED APPLICATIONS

This application claims the benefit under 35 USC § 119(a) of Chinese patent Application No. 201611118710.X filed on Dec. 7, 2016 in the State of Intellectual Property Office of the People's Republic of China and Korean Patent Application No. 10-2017-0150501 filed on Nov. 13, 2017 in the Korean Intellectual Property Office, the entire disclosures of which are incorporated herein by reference for all purposes.

BACKGROUND

1. Field

The following description relates to a method and apparatus detecting one or more targets.

2. Description of Related Art

Herein, if a target in an image is detected as a biometric target that has been registered in advance, the detected target may be determined as a true target. The target may be, for example, the face of a human, and may be used in various functions, for example, the unlocking of a mobile phone or the authorization for a mobile payment.

There are technological impediments in the detecting of a target, as they are typically vulnerable to various types of spoofing attacks. For example, based on a typical target detection technological approach, a paper print image, a photograph, a screen image, a screen video, and a three-dimensional (3D) print including a face of a user instead of a true face of the user may be erroneously recognized by a terminal device as an actual biometric face of the user.

To forestall the above issue, technological approaches include implementing an intrusive target detection or a non-intrusive target detection by terminal device.

An existing intrusive target detection approach depends on detected interactions of a user with a terminal device. For example, the user performs a specific motion like blinking an eye, waving a head, and making a smile based on predetermined guidelines, and the terminal device identifies the motion of the user and determines whether the user is a true target based on computational analyses of the identified motion. However, when the above approach is applied, the identification operation becomes relatively cumbersome, time consuming, and computational intensive, and further requires the user to perform a designated motion.

Existing non-intrusive target detection approaches include the terminal device being configured to extract a feature from an image or video information acquired through a photography device of the terminal device, and determine whether the target is a true target based on the extracted feature. For example, in one approach, a target detection approach configured to implement an artificial intelligence design is provided. In this approach, a human designer must hand craft an objective algorithm based on the designer's experiences of related computer visual and image processing research areas, for extracting a feature in an image or video. However, due to performance differences between photography devices of different terminal devices, differences are present in the target image. For example, some images may be slightly overexposed or use a different red hue. In addition, there is a difference between a low illuminance or backlight image and a normal illuminance image. In the case of applying a feature extraction approach, for example, a local binary pattern (LBP) based on such a hand crafted artificial intelligence approach can only consider local texture information of an image. In this case, whether a target is a true target cannot be effectively verified or authenticated under a low illuminance or backlight condition. That is, based on the existing non-intrusive target detection approaches, the accuracy of the determination of whether the target is a true target varies based on the variety and complexity of the actual situation, and thus, such a hand approach cannot be efficiently applied in the various and complex actual situations.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, there is provided a method of detecting a target, the method including determining a quality type of a target image; determining a convolutional neural network of a quality type corresponding to the quality type of the target image by referring to a database including a plurality of convolutional neural networks; determining a detection value of the target image based on the convolutional neural network of the corresponding quality type; and determining whether a target in the target image is a true target based on the detection value of the target image.

The quality type of the target image may be determined based on at least one quality value of the target image that is determined in correspondence to at least one quality parameter. The detection value may include a probability that the target image is classified as a true sample including the true target.

The determining of the quality type of the target image may include determining at least one quality value of the target image in correspondence to at least one quality parameter; determining at least one quality classification of the target image based on the at least one quality value and at least one quality type classification standard that is preset in correspondence to the at least one quality parameter; and determining the quality type of the target image based on the at least one quality classification. Alternatively, the determining of the quality type of the target image may include determining the quality type of the target image by performing a blind image quality evaluation on the target image.

The convolutional neural network may include a cascaded convolutional neural network that includes convolutional neural networks of at least two stages and at least one threshold determining layer.

The cascaded convolutional neural network of each quality type may require a different performance index, and a number of stages included in the cascaded convolutional neural network of each quality type may be determined based on a corresponding performance index. The performance index required by the cascaded convolutional neural network may be satisfied by a combination of performance indices of convolutional neural networks of a plurality of stages included in the cascaded convolutional neural network.

The determining of the detection value of the target image may include determining a detection value of a first stage of the target image based on a convolutional neural network of a first stage included in the cascaded convolutional neural network; and performing a process of determining a detection value of a subsequent stage of the target image by comparing the detection value of the first stage and a preset threshold based on a threshold determining layer connected to the convolutional neural network of the first stage.

The determining whether the target in the target image is the true target based on the detection value of the target image may include determining a blur evaluation value of a current frame in response to the target image being the current frame in a frame image; determining a collective detection value of the target image based on the blur evaluation value of the current frame, a detection value of the current frame, blur evaluation values of a plurality of previous frames in the frame image, and detection values of the plurality of previous frames; and determining whether a target in the current frame is the true target based on the collective detection value of the target image.

The determining of the collective detection value of the target image may include determining a weighted average value of detection values by using each of the blur evaluation values of the current frame and the plurality of previous frames as a weight of a corresponding detection value, and determining the weighted average value as the collective detection value.

In another general aspect, there is provided a method of training a convolutional neural network, the method including determining a quality type of a sample image; selecting a convolutional neural network of a quality type corresponding to the determined quality type of the sample image from among a plurality of quality types of convolutional neural networks; and training the selected convolutional neural network of the quality type based on whether the sample image is a true sample or a false sample.

The sample image may correspond to the true sample in response to the sample image including a true target, and the sample image may correspond to the false sample in response the sample image not including the true target. The method of training the convolutional neural network may further include constructing a database based on the convolutional neural network of each quality type.

In another general aspect, there is provided a target detection apparatus including a processor configured to: determine a quality type of a target image; determine a convolutional neural network of a quality type corresponding to the quality type of the target image by referring to a database comprising convolutional neural networks; determine a detection value of the target image based on the convolutional neural network of the corresponding quality type; and determine whether a target in the target image is a true target based on the detection value of the target image.

The target detection apparatus may further include a memory configured to store instructions. The processor may be further configured to execute the instructions to configure the processor to: determine the quality type of the target image; determine the convolutional neural network of the quality type corresponding to the quality type of the target image by referring to the database comprising convolutional neural networks; determine the detection value of the target image based on the convolutional neural network of the corresponding quality type; and determine whether the target in the target image is the true target based on the detection value of the target image.

The processor may include an image quality type determiner configured to determine the quality type of the target image; a convolutional neural network determiner configured to determine the convolutional neural network of the quality type corresponding to the quality type of the target image by referring to the database comprising convolutional neural networks; a detection value determiner configured to determine the detection value of the target image based on the convolutional neural network of the corresponding quality type; and a true target determiner configured to determine whether the target in the target image is the true target based on the detection value of the target image.

The convolutional neural network may include a cascaded convolutional neural network that comprises convolutional neural networks of at least two stages and at least one threshold determining layer.

The cascaded convolutional neural network of each quality type may require a different performance index, and a number of stages included in the cascaded convolutional neural network of each quality type may be determined based on a corresponding performance index.

The detection value determiner may be configured to: determine a detection value of a first stage of the target image based on a convolutional neural network of a first stage included in the cascaded convolutional neural network; and perform a process of determining a detection value of a subsequent stage of the target image by comparing the detection value of the first stage and a preset threshold based on a threshold determining layer connected to the convolutional neural network of the first stage.

The true target determiner may be configured to: determine a blur evaluation value of a current frame in response to the target image being the current frame in a frame image; determine a collective detection value of the target image based on the blur evaluation value of the current frame, a detection value of the current frame, blur evaluation values of previous frames in the frame image, and detection values of the previous frames; and determine whether a target in the current frame is the true target based on the collective detection value of the target image.

Other features and aspects will be apparent from the following detailed description, the drawings, and the claims.

BRIEF DESCRIPTION OF THE DRAWINGS

FIG. 1 is a flowchart illustrating an example of a target detection method.

Figure 2A:
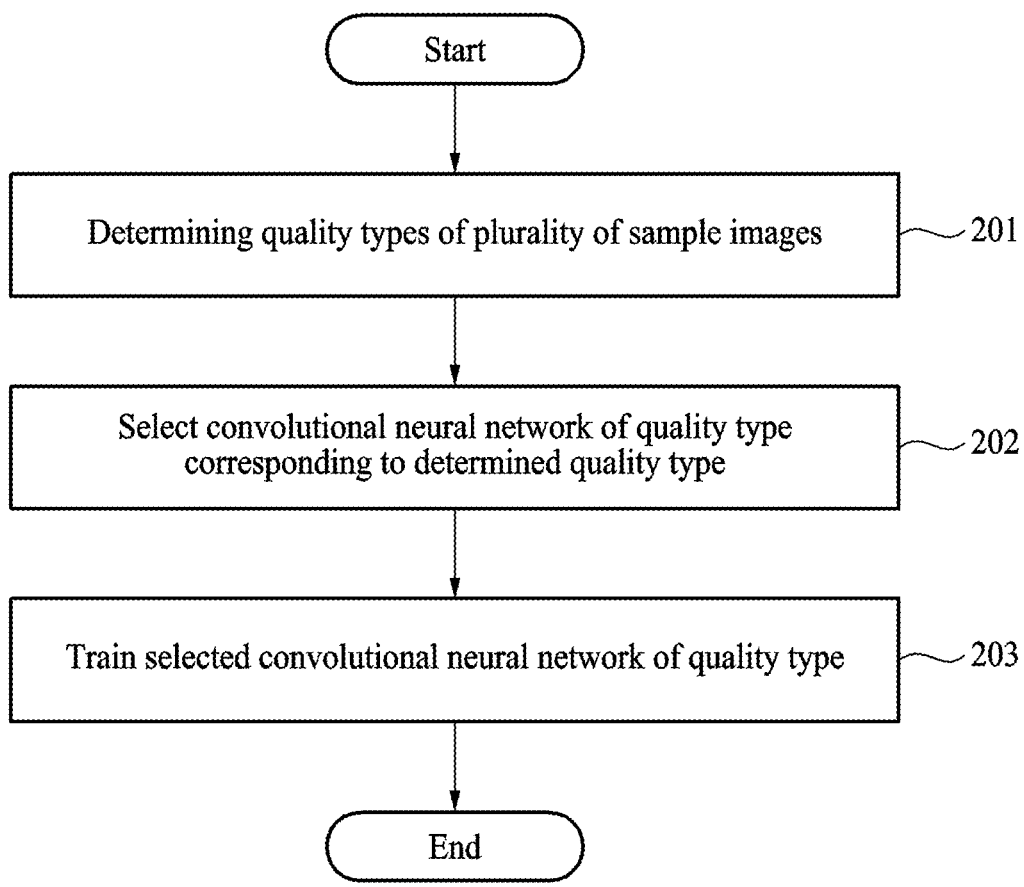
FIG. 2A is a flowchart illustrating an example of a method of training a convolutional neural network.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term 'may' herein with respect to an example or embodiment, e.g., as to what an example or embodiment may include or implement or result in, means that at least one example or embodiment exists where such a feature is included or implemented or a result while all examples and embodiments are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined herein, all terms used herein including technical or scientific terms have the same meanings as those generally understood by one of ordinary skill in the art consistent with the present disclosure. Terms defined in dictionaries generally used should be construed to have meanings matching with contextual meanings in the related art and the present disclosure and are not to be construed as an ideal or excessively formal meaning unless otherwise defined herein.

Examples also use a convolutional neural network suitable for a quality type of each target image by determining the quality type of each target image and by determining a convolutional neural network corresponding to the determined quality type. Accordingly, examples may further accurately detect a true target included in each target image.

FIG. 1 is a flowchart illustrating an example of a target detection method. Referring to FIG. 1, the target detection method includes operation 101 that determines a quality type of a target image; operation 102 determines a convolutional neural network of a quality type that corresponds to the quality type of the target image; operation 103 determines a detection value of the target image based on the convolutional neural network of the corresponding quality type; and operation 104 determines whether a target in the target image is a true target based on the detection value of the target image.

Example embodiments provide a methodology that accurately detects a target using a different convolutional neural network based on the quality type of a target image regardless of various factors that affect the quality type of the target image. Here, detecting the target may be understood to determine whether the target is a true target, for example, a biometric target in a target image. For example, if the target included in the target image is a biometric face, the target may be recognized as a true target. If the target included in the target image is a non-biometric face, for example, a photograph and an image, the target may be recognized as a false target. Hereinafter, the target detection method may be understood as a method of detecting liveness of a target.

The target is a body portion of a creature, for example, a face, a palm print, a fingerprint, an iris, and a limb of a human, and a face, a palm print, a fingerprint, an iris, and a limb of an animal. The true target is a biometric target and the false target is a non-biometric target.

The quality type of the target image may be determined based on at least one quality value of the target image that is determined in correspondence to at least one quality parameter. The quality parameter may include a photography parameter, an attribute parameter, and the like. The photography parameter may include, for example, a resolution and an ISO sensitivity (e.g., an International Standards Organization (ISO) standardized scale or measure of a camera's ability to capture light). The attribute parameter may include, for example, color quasi, a contrast, a brightness, a saturation, and a sharpness. A quality value is understood to be a value or indicator of the target image corresponding to the quality parameter.

The photography parameter and the attribute parameter may be different based on the target image. In this case, each target image may have a different quality type. For example, the quality type of the target image is different based on the performance of the photography device of a user's terminal. The quality type of the target image may be different based on various photography environments, for example, the illuminance of the image. A detection result based on using the same convolutional neural network with different quality types may result in inaccurate results. One or more examples may guarantee an accurate detection result in various terminals or environments capable of being used or experienced by a user employing a convolutional neural network based on a quality type.

The example convolutional neural network may be trained through supervised learning and/or un-supervised learning. Supervised learning refers to a method of inputting a known training input into an example neural network, while knowing the expected corresponding training output for that known training input, and repetitively or recursively updating or adjusting connection weights of the neural network until the correct training output corresponding to the training input is output, e.g., within a predetermined level or accuracy and/or level of inaccuracy. The correct training output may also include one or more correct feature extractions, for example.

Figure 7:
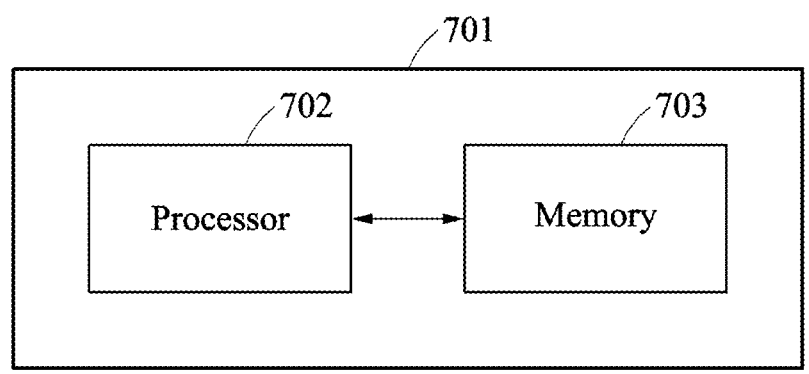
FIG. 7 is a block diagram illustrating an example of a CNN processing apparatus in accordance with one or more embodiments.
Figure 8:
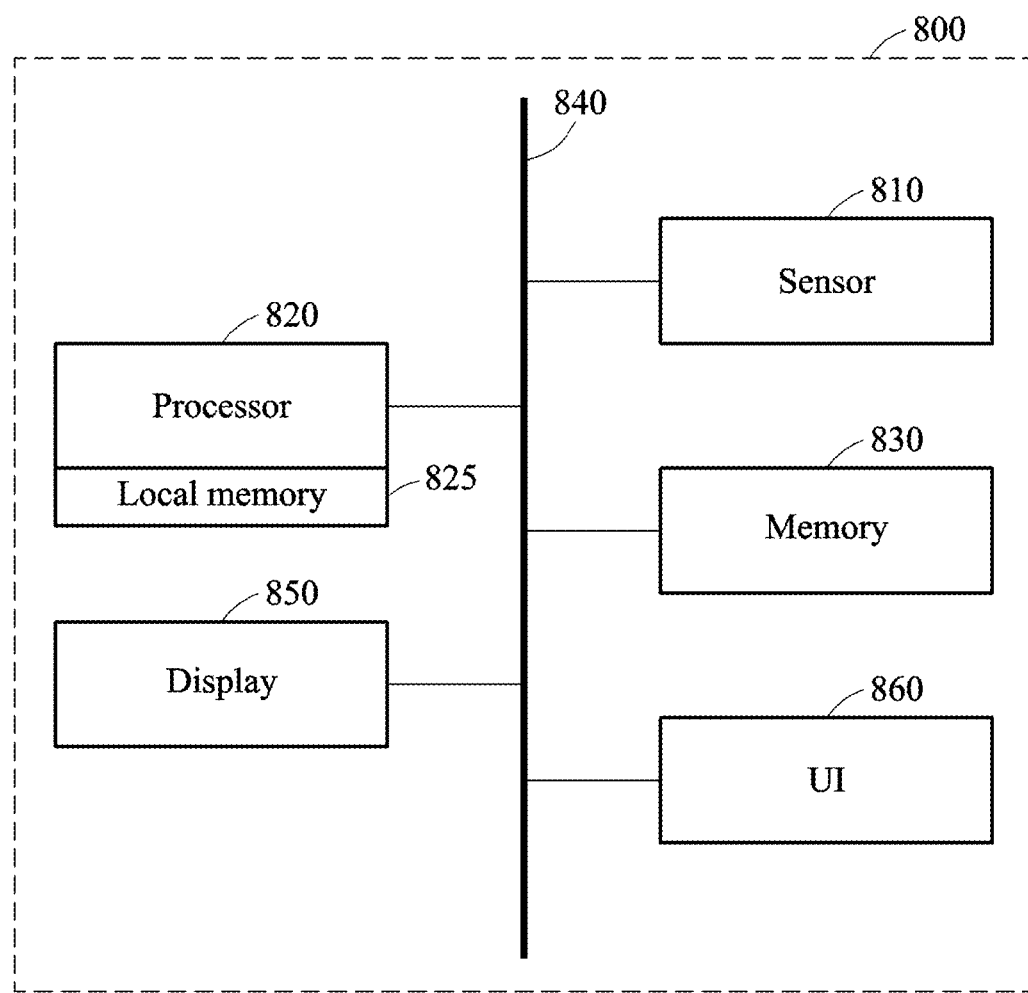
FIG. 8 is a block diagram illustrating an example of a computing apparatus in accordance with one or more embodiments.

As only a non-limiting example, as noted, the training herein may be performed through backpropagation learning, which refers to a method of estimating losses throughout the neural network with respect to provided training data through forward computation or implementation of the in-training neural network input the training data, and then through respective adjusting of the connection weights of the in-training neural network to reduce such losses while propagating estimated losses in a backward direction from the output layer, to a highest hierarchical hidden layer, then to the next lower hierarchical layer, etc., until the connection weights from the input layer are adjusted for reduced loss. Thus, computation or implementation of the neural network with either final trained parameters or the in-training (through repetitive adjustments) training of parameters are thus performed in the forward direction for the desired recognition objective of the neural network in an order of the input layer, a next hierarchical hidden layer, a subsequent hierarchical hidden layer, etc., through to the output layer. However, in the backpropagation learning, the connection weights of respective layers may be updated in the backward direction of an opposite order of the output layer, e.g., the highest hierarchical hidden layer, the next lower hierarchical hidden layer, etc., through to the input layer, by iterative adjustments of connection weightings between and within the layers to reduce the aforementioned respective losses. As non-limiting examples, and noting that additional or alternative conditions may be considered to determine when to cease training of the neural network, the training operation may be repeatedly performed for various input and through multiple passes until an overall loss, as only an example, at the output layer and/or the losses of the hidden layers are respectively less than respective predetermined loss thresholds. The finally adjusted connection weights of the neural network may then be stored in a memory of an example recognition apparatus, such as illustrated in FIGS. 7 and 8, as trained parameters of the neural network.

Such a recognition apparatus, or another recognition apparatus, may thereby implement the trained neural network by reading and implementing the stored parameters for then input information. For example, one or more processors described herein may obtain or read such stored trained parameters of one or more select neural networks from a memory, e.g., one or more convolutional neural networks, and upon implementation of the obtained or read parameters be configured to include the neural network. For example, the one or more processors may be configured to implement a select neural network by obtaining or reading the corresponding stored trained parameters and applying the same to input information, to implement the neural network to perform the trained objective of the neural network, e.g., to extract a trained feature and/or detect a target based on such extracted features. Thus, the one or more processors may be configured to obtain data associated with the select neural network from a memory, and configured to perform operations associated with the neural network to perform feature extraction and/or target identification from information input to the configured neural network.

Accordingly, operation 101 includes determining at least one quality value of the target image in correspondence to at least one quality parameter; determining at least one quality classification of the target image based on the at least one quality value and at least one quality type classification standard that is preset in correspondence to the at least one quality parameter; and determining the quality type of the target image based on the at least one quality classification.

The quality type classification standard may be defined for each quality parameter. The quality type classification standard is used to classify a quality classification according to a quality value of the target image for each quality parameter. For example, a quality type classification standard of a resolution parameter may classify the quality classification of the target image into a high resolution, an intermediate resolution, and a low resolution, based on a resolution value of the target image.

The quality type of the target image may be determined by any one or more combinations of quality classifications. In an example, the quality type of the target image may be represented as {resolution: high, brightness: low, sharpness: intermediate}. The quality type of the target image may be variously modified using, for example, a method of determining a representative value among quality classifications.

Operation 102 includes selecting a convolutional neural network of a quality type corresponding to the quality type of the target image by referring to a database that includes a plurality of quality types of convolutional neural networks. The database may be acquired by determining quality types of a plurality of sample images and by the aforementioned training of the convolutional neural network of the corresponding quality type based on sample images of each quality type.

In one example, a convolutional neural network used to detect a target may be a convolutional neural network of a single stage, e.g., of a single hidden layer. Whether a target in the target image is a biometric target may be determined based on an output of the convolutional neural network. Based on a target detection application, the probability that a sample including a true target is a classified as a true sample may need to be greater than or equal to a desired probability, for example. Alternatively, the probability that a sample including a false target is erroneously classified as a true sample may need to be less than the desired probability, for example. The performance of the convolutional neural network may be enhanced by adjusting a structure and/or a parameter of the convolutional neural network, thereby satisfying a performance condition required by each application.

In one example, the convolutional neural network may be a cascaded convolutional neural network. The cascaded convolutional neural network may include convolutional neural networks of a plurality of stages. In the case of using the convolutional neural networks of the plurality of stages, the convolutional neural network of each stage may have a performance less than the required performance for the entire cascaded convolutional neural network.

Operation 103 may include inputting the target image to the convolutional neural network selected from the database; and acquiring a detection value from an output of the convolutional neural network. The convolutional neural network may output a probability that the target image is classified as a true sample including the true target. The probability that the target image is classified as the true sample including the true target may be used as the detection value.

Operation 104 includes determining whether the target is the true target by comparing the detection value and a preset threshold.

Example embodiments may not require a user to perform a specific motion in order to detect a target, and may accurately detect the target from a target image acquired under various hardware conditions or photography environments. Accordingly, it is possible to enhance the robustness of determining the true target.

FIG. 2A is a flowchart illustrating an example of a method of training a convolutional neural network. Referring to FIG. 2A, in addition to the above discussion regarding the training of the convolutional neural network, the method of training the convolutional neural network includes operation 201 of determining quality types of a plurality of sample images.

Operation 201 includes acquiring a quality value corresponding to at least one quality parameter with respect to each of the plurality of sample images; and determining a quality type of a sample image based on at least one quality value of the sample image.

A quality type classification standard for determining a quality type may be determined in advance based on experimental data, historical data, empirical data and/or actual situations. In one example, a quality type classification standard of a resolution may include a standard for classifying the resolution quality classification of an image as a high quality resolution if a resolution of a short side of the image (for example, a vertical resolution of the image) is greater than 1080 pixels; an intermediate quality resolution if the resolution is greater than or equal to 720 pixels and less than 1080 pixels; and a low quality resolution if the resolution is less than 720 pixels.

In one example, the quality type of an image may be determined based on a quality classification that is based on a hierarchical structure of a quality parameter. For example, a quality classification of a photography parameter may be determined based on a parameter having a lowest quality classification among a plurality parameters included in the photography parameter of an image and a quality classification of an attribute parameter may be determined based on a parameter having a lowest quality classification among a plurality of parameters included in the attribute parameter of the image. In this case, the quality type of the image may be determined by combination of the quality classification of the photography parameter and the quality classification of the attribute parameter.

In another example, a selection may be repeated until a quality classification of a parameter randomly selected from among the plurality of parameters included in the photography parameter of the image and a quality classification of a parameter randomly selected from among the plurality of parameters included in the attribute parameter reach the same quality classification, for example, a high quality, and the quality type of the image may be determined based on the corresponding quality classification.

In another example, the quality type of the image may be determined based on a quality classification of each of the plurality of parameters included in the photography parameter and the plurality of parameters included in the attribute parameter.

For example, the quality type of a resolution of a sample image is determined based on a quality type classification standard of a preset resolution and a resolution of a short side of the sample image. The quality type of an ISO sensitivity of the sample image is determined based on a quality type classification standard of a preset ISO sensitivity and an ISO sensitivity of the sample image. The quality type of a contrast of the sample image is determined based on a quality type classification standard of a preset contrast and the contrast of the sample image.

In this case, the quality type of the sample image is determined based on the quality types of the resolution, the ISO sensitivity, and the contrast of the sample image. For example, if all of the resolution, the ISO sensitivity, and the contrast of the sample image correspond to a high quality, the quality type of the sample image may be determined as the high quality. As another example, if the resolution, the ISO sensitivity, and the contrast of the sample image correspond to a high quality, an intermediate quality, and a low quality, respectively, the quality type of the sample image may be determined as the intermediate quality. As another example, the quality type of the sample image may be determined as a quality type of three phases including the high quality of the resolution, the intermediate quality of the ISO sensitivity, and the low quality of the contrast of the sample image.

In one example, the quality type of the sample image may be determined by performing a blind image quality evaluation on the sample image. For example, a spatial information based blind/referenceless image spatial quality evaluator (BRISQUE) method, a gradient magnitude and Laplacian of Gaussian (GM-LOG) based method, and a high order statistics aggregation (HOSA) based method may be used for the blind image quality evaluation.

For example, the spatial information based BRISQUE method includes performing spatial standardization processing on a primitive sample image, for example, subtracting an average value of parameters of the primitive sample image from each of the parameters, and dividing the subtraction result by a standard deviation; using, as a feature of an image a parameter of a distribution acquired by fitting a parameter distribution of the sample image after performing spatial standardization processing using a generalized Gaussian distribution; and determining an image quality evaluation result using an evaluation model that is acquired through advance training using a support vector regression method. Here, the evaluation model is trained using many images each to which an image quality evaluation value is labeled, and acquired based on a mapping relationship between a quality evaluation value and a support vector regression learning feature in a state in which a quality evaluation value and a feature of an image are provided.

The quality type of the sample image may be determined by performing a quality type classification on an image quality evaluation result that is acquired using the BRISQUE method, based on a quality type classification standard of a BRISQUE based image quality evaluation result.

The method of training the convolutional neural network includes operation 202 of selecting a convolutional neural network of a quality type corresponding to the determined quality type of the sample image from among a plurality of quality types of convolutional neural networks.

The plurality of quality types of convolutional neural networks may have the same or different structures. Here, the different quality types of convolutional neural networks are trained based on different image samples and thus, have different parameters, for example, ultimately different trained connection weights. The connection weights will have various values dependent on the training process and training data, so the trained neural network has a unique and specialized configuration.

In the case of using a cascaded convolutional neural network, the number of stages may differ since a different performance condition is required for each quality type. Even in this case, the convolutional neural network of a single stage may be in the same or different structure.

In one example, prior to training the convolutional neural network, selectable quality types may be determined in advance and the structure of the convolutional neural network may be determined for each quality type.

The method of training the convolutional neural network includes operation 203 to train the selected convolutional neural network of the quality type based on whether the sample image is a true sample or a false sample. If the sample image includes a true target, the sample image corresponds to the true sample, and unless the sample image includes the true target, the sample image corresponds to the false sample.

A convolutional neural network of a corresponding quality type may be trained based on a plurality of sample images of the corresponding quality type with respect to each quality type of the sample image. For example, a single group may be generated for each of a plurality of quality types into which a plurality of sample images and sample images included in the same group may have the same quality type. In this case, the convolutional neural network of the corresponding quality type may be trained based on a plurality of sample images having the same quality type in each group.

For example, if the quality type of sample images of a single group includes a high quality resolution, a high quality ISO sensitivity, and a high quality contrast, the cascaded convolutional neural network of a high quality is trained based on the sample images of the group. Alternatively, if the resolution of sample images of a single group is high quality with an intermediate quality ISO sensitivity and a low quality contrast, the convolutional neural network of a corresponding quality type, for example, a high quality resolution, an intermediate quality ISO sensitivity, and a low quality contrast, is trained based on the sample images of the corresponding group.

In one example, the database may be constructed based on a convolutional neural network of each quality type.

Figure 2B:
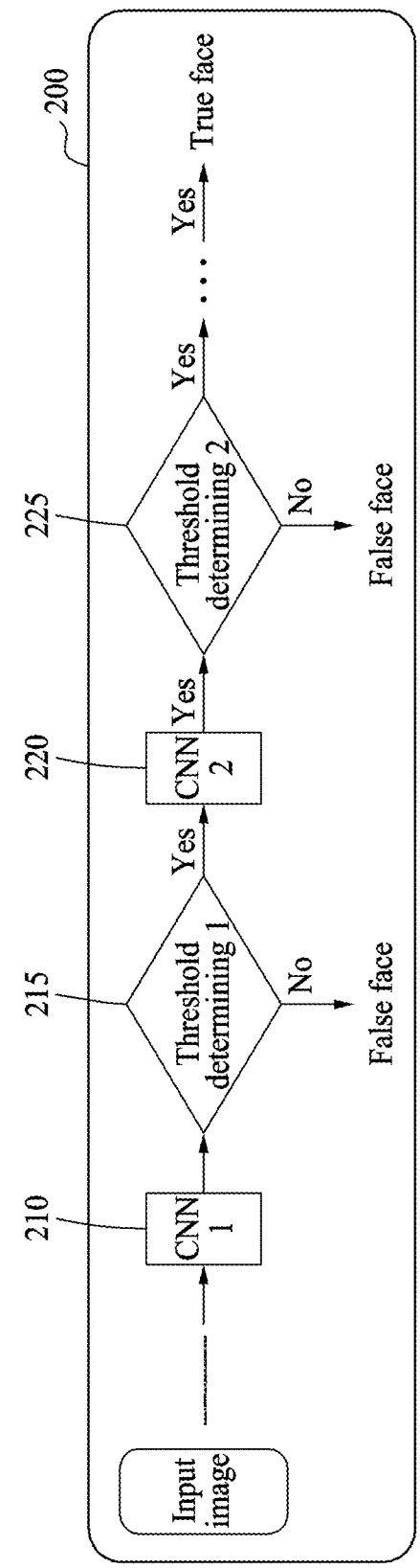
FIG. 2B illustrates an example of a structure of a cascaded convolutional neural network of a computing apparatus 200.

FIG. 2B illustrates an example of a structure of a cascaded convolutional neural network of a computing apparatus 200. Referring to FIG. 2B, a cascaded convolutional neural network of each quality type includes convolutional neural networks of at least two stages and at least one threshold determining layer. The threshold determining layer of a current stage is connected between the convolutional neural network of the current stage and the convolutional neural network of a subsequent stage. In detail, an input layer of the threshold determining layer of the current stage is connected to an output layer of the convolutional neural network of the current stage; and an output layer of the threshold determining layer of the current stage is connected to an input layer of the convolutional neural network of the subsequent stage.

Referring to FIG. 2B, a convolutional neural network (CNN) 1 210 and a CNN 2 220 represent the convolutional neural network of a first stage and the convolutional neural network of a second stage, respectively. A threshold determining 1 215 represents the threshold determining layer of the first stage, and is connected between the convolutional neural networks of the first stage and the second stage. A threshold determining 2 225 represents a threshold determining layer of the second stage and is connected between the convolutional neural network of the second stage and a convolutional neural network (not shown) of a third stage.

The method of training the cascaded convolutional neural network of each quality type includes a method of determining the number of stages of the cascaded convolutional neural network, a method of training a convolutional neural network of each stage, and a method of determining a threshold determining layer of each stage.

In one example, an output of a convolutional neural network of each stage has a performance index, for example, a true positive rate (TPR) and a false positive rate (FPR). The TPR indicates a rate at which a true sample is accurately classified as the true sample, and the FPR indicates a rate at which a false sample is erroneously classified as the true sample.

The method of determining the number of stages of the cascaded convolutional neural network includes determining the number of stages of a cascaded convolutional neural network of a corresponding quality type based on a performance index required by a cascaded convolutional neural network of each quality type. The cascaded convolutional neural network of each quality type may require a different performance index and the number of stages included in the cascaded convolutional neural network of each quality type may be determined based on the corresponding performance index.

For example, the cascaded convolutional neural network of each quality type may require TPR=99.5% and FPR=0.1%. Here, the convolutional neural network of the first stage may adjust a threshold to be TPR=99.9% and FPR=10% and the convolutional neural network of the second stage may adjust the threshold to be TPR=99.9% and FPR=10%. A performance index FPR=10%*10%=1% in which the two convolutional neural networks are cascaded does not satisfy an FPR requirement 0.1% of the entire cascaded convolutional neural network. If the convolutional neural network of the third stage having the same performance as those of the convolutional neural networks of the first stage and the second stage are added, the performance index reaches the FPR requirement of the entire cascaded convolutional neural network. In this example, a number of stages of the cascaded convolutional neural network is determined as three. The performance index in which the convolutional neural networks of the first stage, the second stage, and the third stage are cascaded satisfies the performance requirement of the entire cascaded convolutional neural network (TPR=99.9%*99.9%*99.9%>99.5%, FPR=10%*10%<=0.1%). As described above, the performance index required by the cascaded convolutional neural network may be satisfied by combination of performance indices of convolutional neural networks of a plurality of stages included in the cascaded convolutional neural network.

Hereinafter, a method of training a convolutional neural network of each stage is described.

In detail, among a plurality of sample images of each quality type, a sample image including a true target is a true sample and a sample image including a false target is a false sample. The false target may include, for example, a print image of the true target, a photograph of the true target, a screen representing the true target, and a 3D print model of the true target.

An iterative training is performed on a sequential distribution of the convolutional neural network of each stage. A parameter of the convolutional neural network of the first stage is iteratively trained using a reverse direction propagation algorithm by inputting a true sample and a false sample. In an example in which a TPR of the convolutional neural network of the first stage is a relatively high value, for example, TPR=99.9%, and an FPR thereof is not a high value, for example, FPR=20%, a false sample may be erroneously classified as a true sample. The true sample and the false sample classified in the convolutional neural network of the first stage are selected and iterative training is performed on a parameter of the convolutional neural network of the second stage. Based on the same principle, a last true sample and false sample classified in the convolutional neural network of the second stage are selected and iterative training is performed on a parameter of the convolutional neural network of the last stage. In this manner, the convolutional neural network of each stage of the cascaded convolutional neural network may be finally acquired. Although a description is made based on an example in which the number of stages is three for clarity of description, the number of stages may be variously modified.

Figure 2C:
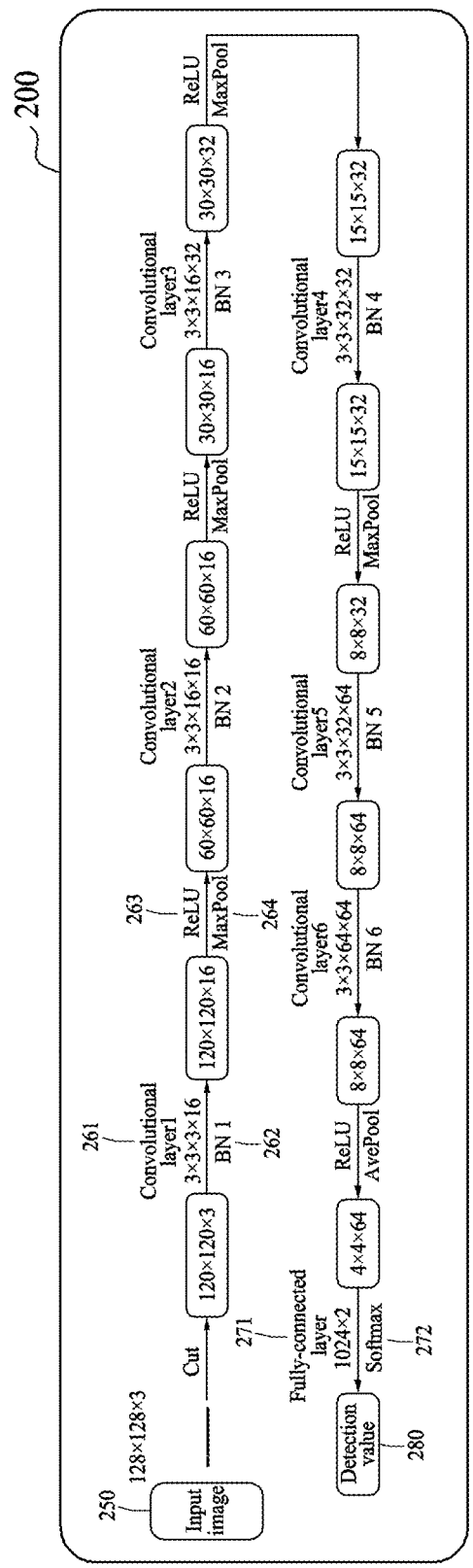
FIG. 2C illustrates an example of a structure of a convolutional neural network of a single stage of the computing apparatus 200.

FIG. 2C illustrates an example of a structure of a convolutional neural network of a single stage of the computing apparatus 200. Referring to FIG. 2C, the convolutional neural network includes a sequentially cascaded input layer, first through sixth sub-networks, a fully-connected layer 271, and an output layer. The first sub-network, the second sub-network, the third sub-network, the fourth sub-network, or the sixth sub-network includes a convolutional layer, a batch normalization (BN) layer, a rectified linear unit (ReLU) layer, and a pooling layer. The fifth sub-network includes a convolutional layer and a BN layer.

In FIG. 2C, an input image 250 has a size of 128×128×3. Here, 128×128 indicates a resolution of the input image 250 and 3 indicates a number of channels, for example, red (R), green (G), and blue (B) channels. 120×120×3 between the input image 250 and a convolutional layer 1 261 of the first sub-network indicates a size of CNN input. To acquire an image with the size of 120×120×3 from the input image 250, the input image 250 may be edited through center cutting using three 120×120 matrices.

In 3×3×3×16 of the convolutional layer 1 261, 3×3 indicates that a unit scan template of the convolutional layer 1 216 is a 3×3 pixel point matrix, the third 3 on the left indicates a number of pixel point matrices, that is, image channels, of a previous stage, and 16 indicates a number of convolutional kernels or a number of filters, or a depth of a convolutional layer, included in the convolutional layer 1 261. Each convolutional kernel or filter of the convolutional layer 1 261 uses a 3×3 pixel point matrix as a unit scan template and scans a pixel point matrix of each primary color of the input layer by setting a preset number of pixel points, for example, '1' as a scan interval. During a scan process, each convolutional kernel or filter acquires 120× 120(pixel point matrix)×16(layer) after-first-convolution pixel points by sequentially performing convolution on the respective 3×3 pixel points among 120×120 pixel point matrices corresponding to each primary color and by using a plurality of sequentially acquired first convolution results as a plurality of after-first-convolution pixel points. 16 after-first-convolution feature maps are acquired by performing a normalization on pixel points after first convolution of each layer using BN1 (that is, first group normalization) 262 layer. Each feature map includes 120×120 pixel points (that is, a definition of 120×120×16 between BN1 262 and first ReLU 263. The normalization of a BN layer may enhance a convergence rate of the convolutional neural network and a photography condition, for example, a different illuminance may reduce the effect against the performance of the convolutional neural network, thereby enhancing the performance of the convolutional neural network.

In FIG. 2C, the first ReLU 263 may be a first activation function and indicates the unilateral activation of the 16 after-first-convolution feature maps. For example, the feature map is output or activated by maintaining a value greater than or equal to zero and by resetting a value less than zero as zero in the feature map. Accordingly, correlation between parameters of the feature map may be weakened by distributing the parameters of the feature map to be sparse and overfitting of the convolutional neural network during training may be reduced. In FIG. 2C, a first max pooling (MaxPool) 264 indicates a first pooling. A first pooling layer may perform pooling on each of the 16 after-first-convolution feature maps using a max pooling method. A pooling zone may have a size of 2×2, and a single maximum value in the 2×2 zone may be selected as a representative value. As a result, 16 after-first-pooling feature maps, that is, a definition 60×60×16 between the first MaxPool 264 and a convolutional layer 2, may be acquired.

The same description may be applicable to internal structures and operations of the second through the sixth sub-networks.

Figure 4:
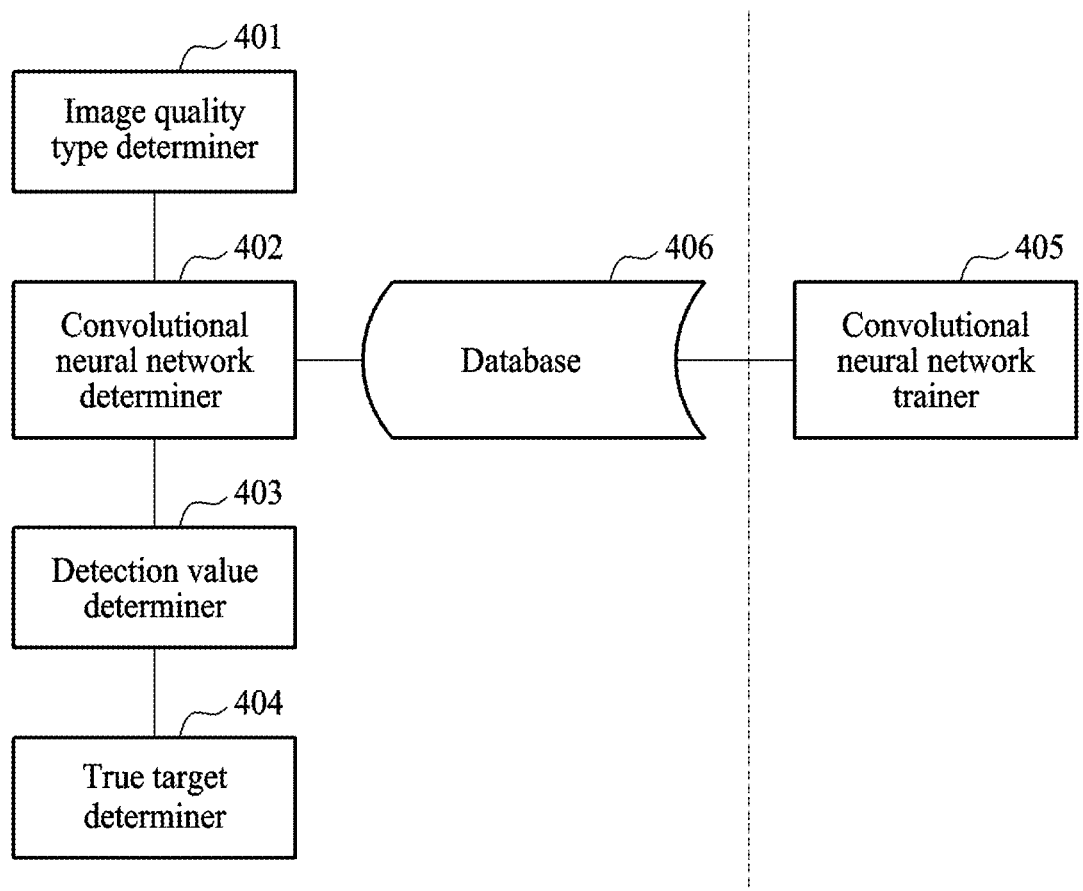
FIG. 4 is a diagram illustrating an example of a target detection apparatus.

Referring to a lower row of FIG. 2C, 4×4×64 indicates 64 feature maps having passed through sixth sub-network processing that is output from the sixth sub-network. Each feature map includes a 4×4 pixel point matrix. The fully-connected layer 271 indicates a layer in which all nodes between adjacent layers are all connected, and 1024×2 indicates a parameter of the fully-connected layer 271. The fully-connected layer 271 converts pixels of 64 4×4 pixel point feature maps to a single 1×1024 vector, acquires a 1×2 result by performing a matrix multiplication operation on the converted vector and parameter matrix 1024×2, and outputs the result using the output layer that is indicated by Softmax (multinomial logistic regression) 272. The result output from the output layer includes a probability that the input image 250 is classified as a true sample and a probability that the input image 250 is classified as a false sample. The probability that the input image 250 is classified as the true sample may be determined as a detection value 280 acquired by processing the input image 250 in the convolutional neural network.

Hereinafter, a method of determining a threshold of a threshold determining layer of each stage after connecting to a convolutional neural network of each stage is described.

In one example, once a detection value of an input image is output in the convolutional neural network of each stage, inspection of the detection value may be performed in a threshold determining layer of a corresponding stage. For example, an image of the detection value having passed the inspection is provided as an input image of a convolutional neural network of a subsequent stage and an image of the detection value having failed in the inspection is determined as a false target image and not provided to the convolutional neural network of the subsequent stage.

In one example, a convolutional neural network of an initial stage may be trained to partially include a misjudgment during a training process and misjudged sample images may be used as false samples of a convolutional neural network of a subsequent stage.

A threshold of the threshold determining layer of each stage may be reasonably set based on experimental data, empirical data, historical data, and/or actual situations, for example, a true target identification rate to be finally achieved. An image input to a convolutional neural network of each subsequent stage through inspection of the threshold determining layer may enhance a classification accuracy of the convolutional neural network of the subsequent stage and may enhance an overall classification accuracy of a true target image.

In one example, TPR and FPR performance output from a convolutional neural network of a current stage may be a result of collecting performances output from convolutional neural networks of the current stage and all of previous stages. For example, a sum of a probability that an input image is classified as a true sample and a probability that the input image is classified as a false image may be 1 and a detection value may be a real number greater than 0 and less than 1. Thresholds of threshold determining layers of the first layer, the second layer, and the third layer may be set to 0.2, 0.3, and 0.2, respectively.

Figure 3A:
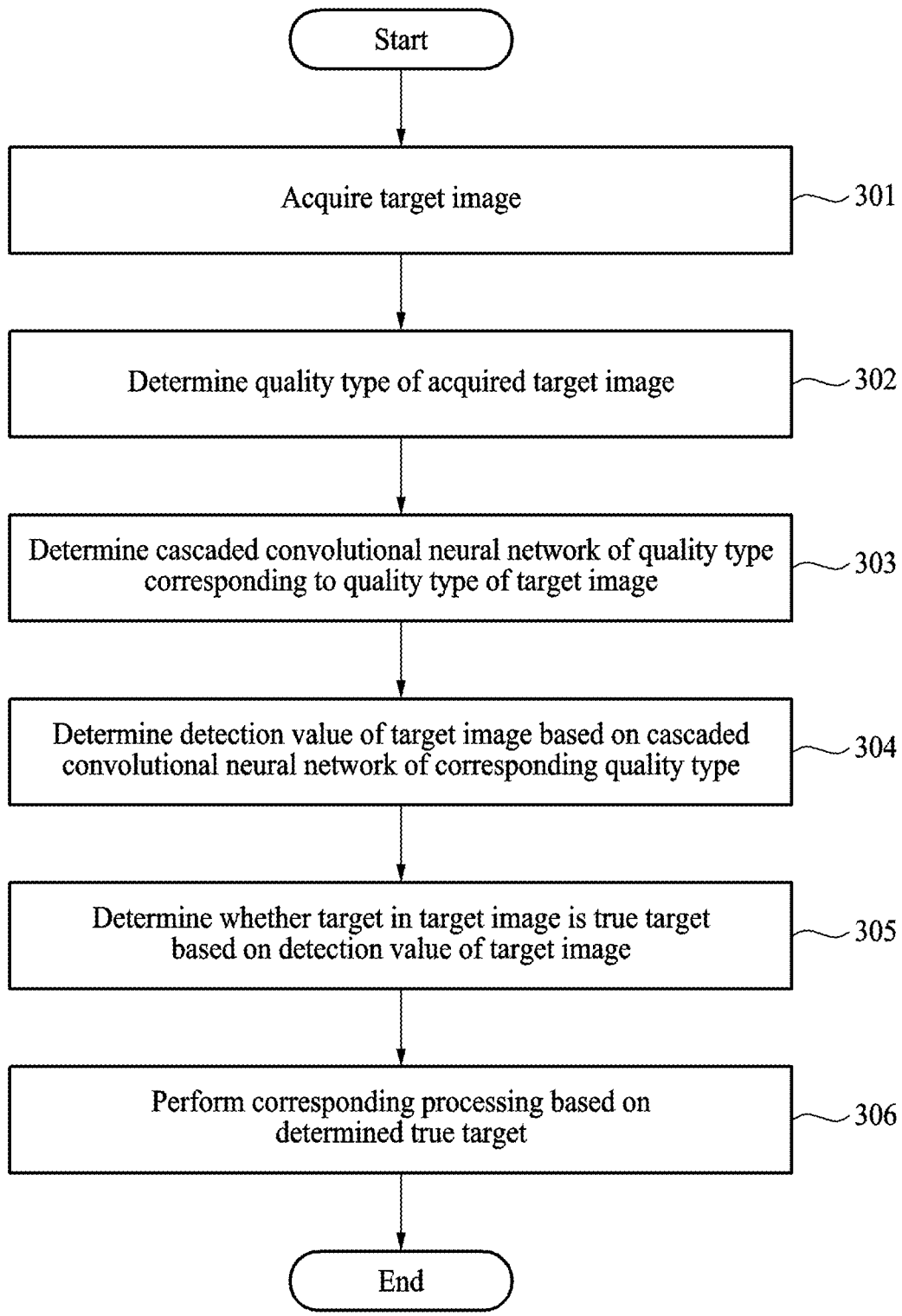
FIG. 3A is a flowchart illustrating an example of a scenario in which a target detection method is applied to an image.

FIG. 3A is a flowchart illustrating an example of a scenario in which a target detection method is implemented. Referring to FIG. 3A, the scenario that is an actual application includes operation 301 of acquiring a target image; operation 302 of determining a quality type of the acquired target image; operation 303 of determining a cascaded convolutional neural network of a quality type corresponding to the quality type of the target image; operation 304 of determining a detection value of the target image based on the cascaded convolutional neural network of the corresponding quality type; operation 305 of determining whether a target in the target image is a true target based on the detection value of the target image; and operation 306 of performing corresponding processing based on the determined true target.

In one example, a terminal device acquires a target image of a target through a photography device. The target image is a single image. The terminal device may acquire consecutive images of the target and may use an image of the target included in each of the consecutive images as the target image. For example, the terminal device may acquire a video of a target and may use each frame image of the target included in the video, that is, a target frame image as the target image.

Operations 302, 303, and 304 of FIG. 3 correspond to operations 101, 102, and 103 of FIG. 1, respectively.

A process of determining a detection value of a current stage of the target image in operation 304 may be performed through the following process. The detection value of the current stage of the target image is determined based on a convolutional neural network of the current stage. Whether the detection value of the current stage is greater than a preset true target detection threshold of the current stage is determined based on a threshold determining layer of the current stage that is connected between convolutional neural networks of the current stage and a subsequent stage. If the detection value of the current stage is greater than the threshold of the current stage, a process of determining a detection value of the subsequent stage of the target image may be performed until a detection value of a last stage of the target image is determined as the detection value of the target image.

For example, if the target image is input to the cascaded convolutional neural network of FIG. 2B, a detection value of the first stage of the target image is determined based on the convolutional neural network (CNN1) 210 of the first stage and whether the detection value of the first stage is greater than a threshold (threshold 1) of the threshold determining layer of the first stage is determined. If the detection value of the first stage is less than the threshold of the threshold determining layer of the first stage, the target of the target image is determined as a false target and the target image is not used for target classification of convolutional neural networks of subsequent stages and the detection value of the first stage is output as the detection value of the target image. If the detection value of the first stage is greater than the threshold of the threshold determining layer of the first stage, a target classification is performed with respect to the convolutional neural network (CNN2) 220 of the second stage by using, as the input image, the target image of the first stage having passed the convolutional neural network classification of the first stage. If a detection value output from a convolutional neural network of a last stage is greater than a threshold of a threshold determining layer of the last stage even in the threshold determining layer of the last stage, the detected target is highly likely to be a true target and the detection value of the last stage greater than the threshold of the threshold determining layer of the last stage is determined as the detection value of the target image.

Operation 305 of FIG. 3 corresponds to operation 104 of FIG. 1.

In one example, if the target image is a single image, a detection value of the target image is compared to a preset true target detection threshold. If the detection value of the target image is greater than the threshold, a target of the target image is determined as a true target. If the detection value of the target image is less than the threshold, the target of the target image is determined as a false target. Here, the true target detection threshold may be preset based on experimental data, empirical data, historical data, and/or actual situations. For example, the true target detection threshold may be set as 0.3.

In one example, if the target image is a frame image, a collective detection value is determined based on a detection value and a blur evaluation value of each frame. A blur evaluation value of the target image may be acquired and stored by performing a blur evaluation of the target image.

For example, the blur evaluation of the target image may be performed using a just noticeable blur (JNB) method, a cumulative probability of blur detection (CPBD) method, and the like.

For example, the CPBD method divides the target image into a plurality of target image blocks, detects a horizontal edge of each target image block using a Canny or Soble edge detection operator, and calculates an edge pixel rate. For example, if an edge pixel rate of a single target image block is greater than a desired value, for example, 0.002, the target image block is determined as an edge image block. If the edge pixel rate is less than the desired value, for example, 0.002, the target image block is determined a non-edge image block.

Further, a minimum clear edge width $w_{JNB}(ei)$ based on contrast C of an edge pixel ei within an edge image block is calculated according to Equation 1.

$$w_{JNB} = \begin{cases} 5, & \text{if } C \leq 50 \\ 3, & \text{if } C \geq 51 \end{cases} \quad \text{[Equation 1]}$$

An actual edge width w(ei) of the edge pixel ei is calculated and an edge blur probability $P_{blur}$ is calculated according to Equation 2. In Equation 2, β denotes a single fixed parameter.

$$P_{blur} = P_{blur}(ei) = 1 - \exp\left(-\left|\frac{w(ei)}{w_{JNB}(ei)}\right|^{\beta}\right) \quad \text{[Equation 2]}$$

A statistical rate of edge pixels having $P_{blur}$ less than a desired value for example, 0.63, with respect to the entire edge pixels is determined as a blur detection value. The blurrier an image, the statistical rate of edge pixels having $P_{blur}$ less than the desired value decreases and a corresponding blur detection value also decreases. A collective detection value is determined by using the blur detection value as a weight of the detection value. Accordingly, a blur image having a small blur detection value may reduce the effect against a true target, for example, a biometric target detection algorithm.

A blur detection value of a current frame target image of a current frame is determined and stored. Based on the same principle, blur detection values of a plurality of previous frame target images of the current frame are determined and stored. Also, the determined detection value of the current frame target image is stored. Also, the detection values of the plurality of previous frame target images of the current frame may be determined and stored.

A collective detection value of the current frame target image is determined based on detection values and blur evaluation values of the current frame target image and the plurality of previous frame target images. For example, the collective detection value of the current frame target image may be determined by using the blur evaluation values of the current frame target image and the plurality of previous frame target images as the respective weights of detection values and by calculating a weighted average value of the detection values.

Figure 3B:
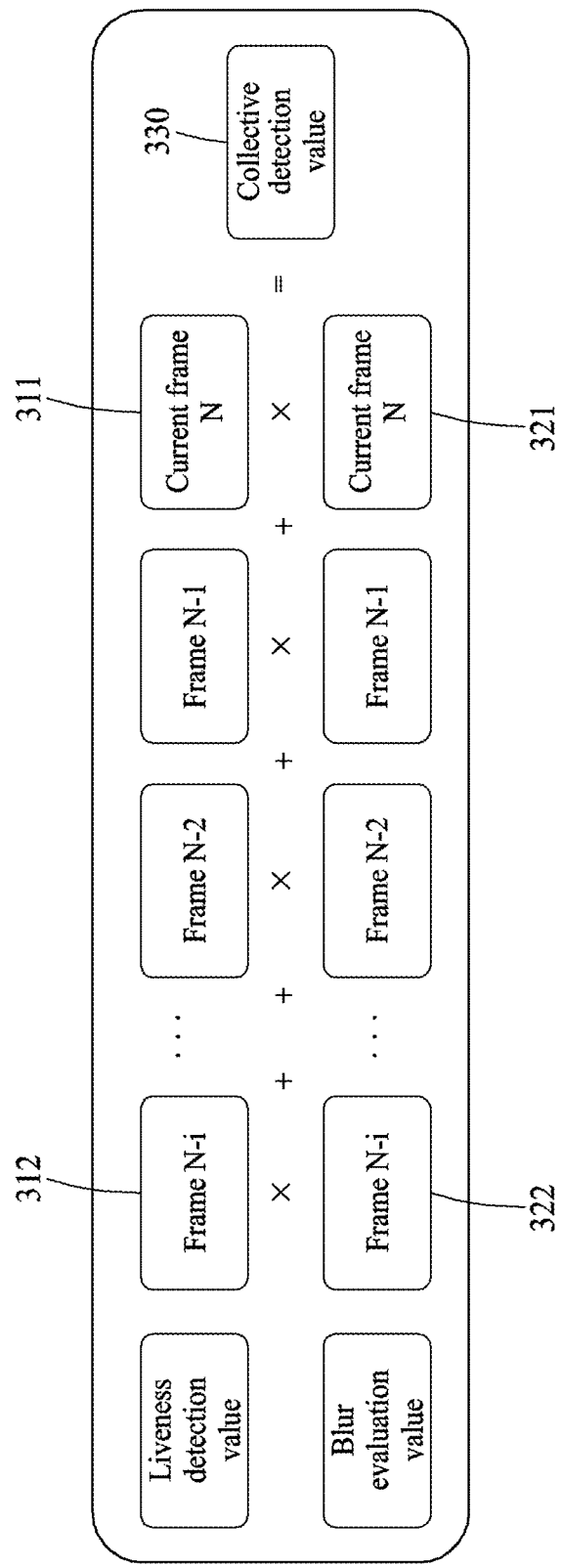
FIG. 3B illustrates an example of describing a target detection method for a frame image.

FIG. 3B illustrates an example of describing a target detection method for a frame image. Referring to an upper row of FIG. 3B, a liveness detection value indicates a detection value and a current frame N 311 indicates a detection value of a current frame target image. Here, N denotes a positive integer. A frame N-i 312 indicates a detection value of a previous frame that is separate from the current frame at a frame interval of i. Here, i denotes a positive integer less than N.

Referring to a lower row of FIG. 3B, a current frame N 321 indicates a blur evaluation value of the current frame target image and a frame N-i 322 indicates a blur evaluation value of the previous frame that is separate from the current frame at a frame interval of i. A collective detection value 330 of the current frame target image is acquired by multiplying a detection value and a blur evaluation value with respect to each frame image of the current frame target image and an i-th previous frame image and by adding up the respective multiplication results.

Referring again to FIG. 3A, in operation 305, whether the target of the current frame target image is a true target is determined based on the collective detection value of the current frame target image. For example, the collective detection value of the current frame target image is compared to a preset true target detection threshold; if the collective detection value is greater than the threshold, the target of the current frame target image is determined as a true target; and if the collective detection value is less than the threshold, the target of the current frame image is determined as a false target.

In operation 306, corresponding processing is performed based on whether the target is true. If the target of the target image is determined as the true target in the aforementioned operation, a processing operation associated with the target image is performed. For example, a payment operation or an unlocking operation associated with the target image may be performed. If the target of the target image is determined as the false target, execution of a related processing operation associated with the target image is rejected. For example, execution of the payment operation or the unlocking operation associated with the target image may be rejected.

FIG. 4 is a diagram illustrating an example of a target detection apparatus. Referring to FIG. 4, the target detection apparatus includes an image quality type determiner 401, a convolutional neural network determiner 402, a detection value determiner 403, and a true target determiner 404.

Here, the image quality type determiner 401 determines a quality type of a target image. The convolutional neural network determiner 402 determines a convolutional neural network of a quality type corresponding to the quality type of the target image determined by the image quality type determiner 401. The detection value determiner 403 determines a detection value of the target image based on the convolutional neural network of the corresponding quality type determined by the convolutional neural network determiner 402. The true target determiner 404 determines whether a target of the target image is a true target based on the detection value of the target image determined by the detection value determiner 403.

In one example, the convolutional neural network determiner 402 may connect to a database 406 that includes a plurality of convolutional neural networks of quality types and may select a corresponding convolutional neural network. The database 406 may be included in the target detection apparatus, or may be connected to the target detection apparatus in a wired or wireless manner.

In one example, a convolutional neural network trainer 405 may train the plurality of quality types of convolutional neural networks included in the database 406. The convolutional neural network trainer 405 may be included in the target detection apparatus and may alternatively be configured as a separate server.

The aforementioned description is applicable to the image quality type determiner 401, the convolutional neural network determiner 402, the detection value determiner 403, the true target determiner 404, the database 406, and the convolutional neural network trainer 405. Accordingly, a further description is omitted.

Hereinafter, a target detection test result is described. It is assumed that a training database includes a total of 391760 sample images and a number of true target images, for example, biometric facial images of persons, is 115145, and the number of false target images, for example, spoof attack images, is 276615. A ratio between the number of true target images and the number of false target images is about 1:3 and sample images are collected from about 500 entities.

The spoof attack images include a print image, a screen image, and a photograph that spoofs a face of a real person.

The training database is divided into a training set and a test set. For example, 80% of images are used for training and 20% of images are used for test. Iterative training is sequentially performed with respect to a convolutional neural network of each stage in a cascaded convolutional neural network. The following Table 1 shows a test result.

TABLE 1

| Structure of a convolutional neural network (CNN) | Classification accuracy of a convolutional neural network (CNN) |
| --- | --- |
| CNN of a single stage | TPR = 97.0%, FPR = 1.0% |
| Cascaded CNN of a plurality of stages | TPR = 99.2%, FPR = 1.0% |

Referring to Table 1, the cascaded convolutional neural network of the plurality of stages shows an excellent accuracy performance compared to that of the convolutional neural network of the single stage.

Figure 5:
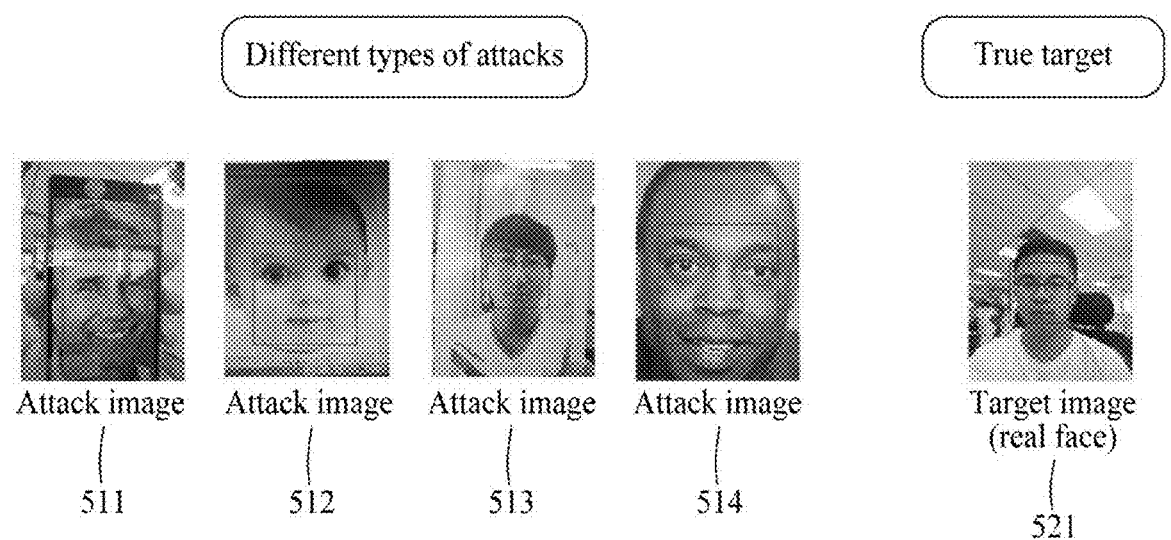
FIG. 5 illustrates an example of describing robustness against various spoof attacks.

FIG. 5 illustrates an example of describing the robustness against various spoof attacks. Referring to FIG. 5, four images on the left are spoof images including a false target and a single image on the right is a target image 521 including a true target. The spoof images include an attack image 511 of a mobile screen including a real human facial image, an attack image 512 of a screen including a real human facial image, an attack image 513 including a real human facial photograph, and an attack image 514 including a printed real human facial image. That is, a target among the spoof attacks may be a photograph, a display screen, or a printed image of the true target.

Figure 6:
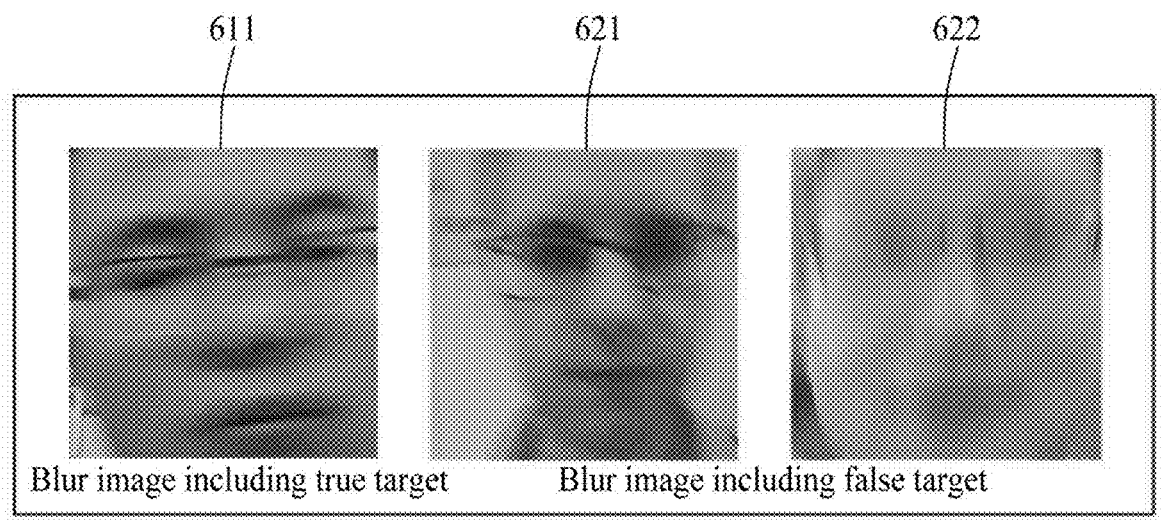
FIG. 6 illustrates an example of describing robustness against a spoof attack of a low quality type.

FIG. 6 illustrates an example of describing robustness against a spoof attack of a low quality type. Referring to FIG. 6, a left image 611 is a blur image including a detected true target, and an intermediate image 621 and a right image 622 are blur spoof images including a detected false target.

In an actual application of a target detection system, a target detection is performed by consecutively collecting a video frame image through a photography device included in a terminal device, such as a mobile phone. As shown in FIG. 6, a motion blur distortion may appear in a collected frame image due to a shaking or a movement of a terminal device. An existing algorithm may not effectively distinguish a blurry true target image and a spoof image, that is, a false target image. According to the aforementioned examples, it is possible to effectively decrease a probability that a true target is misjudged in a blurry image with a motion blur distortion and to accurately detect the true target in the blurry image.

FIG. 7 is a block diagram illustrating an example of a CNN processing apparatus in accordance with one or more embodiments.

Referring to FIG. 7, a CNN processing apparatus 701 includes a processor 702 and a memory 703. The processor 702 is configured to perform any one, any combination, or all operations described herein with respect to FIGS. 1 through 8. The CNN processing apparatus 701 may also correspond to any of the computing or CNN processing apparatuses described herein with respect to FIGS. 1 through 8. The memory 703 stores at least one of features of inputs and/or features of kernels of one or more convolutional layers. In addition, the memory may be non-transitory computer readable media that stores instructions, which when implemented by the processor 701, cause or control the processor 701 to be configured as any one, any combination, or selectively all of the CNNs or convolutional layers discussed herein. Still further, the memory may be non-transitory computer readable media that stores instructions, which when implemented by the processor 701, cause or control the processor 701 to be implement any one, any combination, or all of the operations or methods described herein. The memory 703 includes a volatile memory or a non-volatile memory.

The processor 702 may be configured to control the CNN processing apparatus 701 to perform any one, any combination, or all operations described herein, and/or the CNN processing apparatus 701 may be configured as any of the convolutional layers or CNNs described herein. The CNN processing apparatus 701 may be connected to an external device, for example, a personal computer, mobile device, or a network, through an input/output device, and may exchange data with the external device. The CNN processing apparatus 701 may also be representative of such a device, for example, the personal computer, mobile device, or network, as non-limiting examples.

Accordingly, as discussed herein, the CNN processing apparatus 701 may be configured to implement selective processing or implementing of convolution operations of a select trained CNN for one or more trained objectives of the CNN. In addition, the CNN processing apparatus may include, or be representative of, a neural processing unit (NPU), a vision processing unit (VPU) to control a corresponding dedicated processor, or a TrustZone dedicated processor and/or memory environment, as only examples and noting that alternatives are also available. Thus, the CNN processing apparatus 1001 uses or is representative of, or available for use in, a variety of hardware depending on varied embodiment, and thus is not limited to the examples discussed herein.

FIG. 8 is a diagram illustrating an example of an electronic system or device configured to implement a CNN.

Referring to FIG. 8, an electronic system or device 800 includes a sensor 810, a processor 820, a local memory 825, a memory 830, a display 850, and a user interface (UI) 860. The electronic system or device 800 may also be referred to herein as a recognition apparatus or computing apparatus. The sensor 810, the processor, 820, the memory 830, the display 850, and the UI 860 communicate with each other via a bus 840. The electronic system or device 800 may correspond to any one or more or all of the above CNN processing apparatuses and implement any one or more or all of the above CNN processing processes or methods. As a non-limiting example, the processor 820 may correspond to processor 702 of FIG. 7, and/or the memory 830 may correspond to the memory 703 of FIG. 7. The local memory 825 (and/or the memory 830) may correspond to any of the above described memories. In an example, the memory 830 may store a database from which kernel elements (e.g., as trained parameters of the convolutional layer(s)) and connection weights (as trained parameters between layers) may be loaded from and into the local memory 825. In an example, the local buffers/memories may be memories of the processor 820 or buffers/memories directly connected to the processor 820, e.g., configured for rapidly transferring data to/from the processor 820 and the local memory 825, noting that alternatives are also available. The local memory 825 may further be allocated to temporarily store convolutional output results of a particular layer of the CNN, or all layers of the CNN, the ultimate output results of which may be stored in the memory 830 and/or respectively used for inputs to a next layer for which such results or temporary results may be store in the local memory 825 and/or memory 830. In an example, except for purposes of an input to a next layer, the convolutional results of each layer may otherwise be discarded upon determined completion of a corresponding convolutional layer, and only final layer(s) output results of the CNN stored to the memory 830 or used for another process, such as in an example where the electronic system or device 800 controls the implementation of the CNN in an unlocking and corresponding display operation of a mobile phone as the electronic system or device 800 when the final output indicates a successful face verification and the success is displayed using display 850. The electronic device may alternatively control implementation of the CNN for alternative objectives, such as for speech, voice, or image recognition, battery state estimation, as well as other objectives of the respectively trained CNN and varied embodiments, and may display or otherwise explicitly indicate the results of the CNN implementation and/or otherwise inferentially indicate the results, such as by not providing additional display, by not performing other operations, or by performing such other operations of the electronic device or system 800. Thus the electronic system or device 800 may indicate, e.g., either through explicit or inferential indications, results of the implementation of the CNN.

In an example, any of the memories may be a memory of a dedicated or secure process, processor, or processing component of the electronic device or system 800, e.g., where processor 820 is such a processor or processing component, and such as where a limited Trust Zone of a CPU processor of the CNN processing apparatus is utilized to implement a corresponding neural network for a trained objective of the example CNN or a dedicated or secure processing element/component separate from such CPU processors is utilized to implement the corresponding neural network. As only an example, such limited Trust Zone of the example CPU processor or dedicated or secure processing element/component for example may be implemented when private information is being interpreted or interpreted for, such as in fingerprint or image verification embodiments. Such limited Trust Zones of a CPU processor or such dedicated or secure processing element/component may typically have limited memory resources and/or processing capabilities, and thus, one or more examples may be used with such limited Trust Zones or dedicated or secure processing element/component examples to implement objectives of a trained neural network with reduced resources and/or processing complexities. Non-limiting examples of such trained objectives may be for bio-information, bio-image, acial, or voice verifications, bio-information, bio-image, facial, speech, image, scene, or situation recognitions, or any other non-limiting alternative objectives. For example real-time recognition or verification with such alternative operation examples discussed herein may be available with less computing resources and/or processing requirements, such as where such computing resources and/or processing capabilities are limited, providing further alternative operation examples of technological improvements over previous approaches. As also noted, the processor 820 may represent one or more processors that are configured as any or any combination of the above CNN processing apparatuses, and any recognition apparatuses, rejection apparatuses, and/or verification apparatuses discussed herein, as non-limiting examples.

The sensor 810 includes, for example, a microphone and/or an image sensor or camera to sense video data and audio data to recognize, reject, or verify an object, for example. The sensor 810 senses an image using a well-known scheme, for example, a scheme of converting an optical image to an electronic signal. An output of the sensor 810 is transferred to the processor 820 or the memory 830, and output of the sensor 810 may also be transferred directly to, or operate as, an input layer of any of the CNNs discussed herein.

The processor 820 may be configured to perform one or more or all processes described with reference to FIGS. 1 through 8. For example, to perform a feature extraction, target detection, recognition, rejection, and/or verification operation, the processor 820 may recognize, reject, or verify the input data based on the CNN processing operations described above with respect to FIGS. 1-8, for example. The result of any of such feature extraction, target detection, recognition, rejection, and/or verification operations may be output through the display 850. In addition, any user adjustments or selective operations of the CNN processing operations discussed herein may be provided by UI 860, which may include a touch screen or other input device/system. As noted above, the processor 820 may also be, or include, a graphics processor unit (GPU), reconfigurable processor, or have any other type of multi- or single-processor configuration.

In addition to operations of one or more of the CNN processing apparatuses and/or operations described in FIGS. 1-8, as noted above, the memory 830 may further store instructions which, when executed by processor 820, cause the processor 820 to perform additional operations, functions, and controls of the electronic system or device 800, such as a user interface of the electronic system. The electronic system or device 800 may be connected to an external device, for example, a personal computer (PC) or a network, via an input/output device of the electronic system, to exchange data with the external device. The electronic system or device 800 may be various electronic devices, as only non-limiting examples, a mobile device, for example, a mobile telephone, a smartphone, a personal digital assistant (PDA), a tablet computer or a laptop computer, a computing device, for example, a PC, a tablet computer or a netbook computer, an electronic product, for example, a television (TV), a smart TV, or a security device for gate control.

In or more examples, and based on the examples described above, non-intrusive target detection methods, regardless of performance differences between photography devices of different terminal devices that may result in overexposed images, different color hues, and/or low illuminance image, a true target may be effectively and timely verified and authenticated.

The target detection apparatus, the image quality type determiner 401, the convolutional neural network determiner 402, the detection value determiner 403, and the true target determiner 404 described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method of detecting a target, the method comprising:
   determining a quality type of a captured target image from among a plurality of quality types;
   determining a convolutional neural network of a quality type corresponding to the determined quality type of the target image in a database comprising a plurality of convolutional neural networks;
   determining a detection value of the target image based on the determined convolutional neural network of the corresponding quality type; and
   determining whether a target in the target image is a true target based on the detection value of the target image.

2. The method of claim 1, wherein the quality type of the target image is determined, from among the plurality of quality types, based on at least one quality value of the target image that is determined in correspondence to at least one quality parameter.

3. The method of claim 2, wherein the at least one quality parameter comprises a photography parameter of the target image and an attribute parameter of the target image.

4. The method of claim 1, wherein the detection value comprises a probability of the target image being classified as a true sample comprising the true target.

5. The method of claim 1, wherein the determining of the quality type of the target image comprises:
   determining at least one quality value of the target image in correspondence to at least one quality parameter;
   determining at least one quality classification of the target image based on the at least one quality value and at least one quality type classification standard that is preset in correspondence to the at least one quality parameter; and
   determining the quality type of the target image based on the at least one quality classification.

6. The method of claim 1, wherein the determining of the quality type of the target image comprises:
   determining the quality type of the target image by performing a blind image quality evaluation on the target image.

7. The method of claim 1, wherein the database is configured for determining of quality types of a plurality of sample images, with each of the plurality of convolutional nerual networks having been respectively trained, for corresponding quality types of the plurality of quality types, respectively using sample images of the plurality of sample images.

8. The method of claim 1, wherein the convolutional neural network comprises a cascaded convolutional neural network having at least two stages and at least one threshold determining layer.

9. A processor implemented method of detecting a target, the method comprising:
   determining a quality type of a target image captured;
   determining a convolutional neural network of a quality type corresponding to the determined quality type of the target image in a database comprising a plurality of convolutional neural networks;
   determining a detection value of the target image based on the determined convolutional neural network of the corresponding quality type; and
   determining whether a target in the target image is a true target based on the detection value of the target image;
   wherein the convolutional neural network comprises a cascaded convolutional neural network having at least two stages and at least one threshold determining layer,
   wherein the cascaded convolutional neural network of each quality type requires a different performance index, and a number of stages included in the cascaded convolutional neural network of each quality type is determined based on a corresponding performance index.

10. The method of claim 8, wherein each of the plurality of convolutional neural networks in the database have different performance indices, and is a corresponding cascaded convolutional neural network having a respective number of stages dependent on a performance index of the corresponding cascaded convolutional neural network.

11. The method of claim 10, wherein the performance index comprises a true positive rate (TPR) indicating a rate for classifying a true sample as the true sample and a false positive rate (FPR) indicating a rate for classifying a false sample as the true sample.

12. The method of claim 10, wherein the different performance indices are provided by a total of respective combinations of performance indices of the respective number of stages included in the corresponding cascaded convolutional neural network.

13. The method of claim 8, wherein the determining of the detection value of the target image comprises:
   determining a detection value of a first stage of the target image based on a convolutional neural network of a first stage included in the cascaded convolutional neural network; and
   performing a process of determining a detection value of a subsequent stage of the target image by comparing the detection value of the first stage and a preset threshold based on a threshold determining layer connected to the convolutional neural network of the first stage.

14. The method of claim 13, wherein the performing of the process of determining the detection value of the subsequent stage comprises:
   sequentially performing the process to determine up to a detection value of a last stage based on a result of comparing a detection value of each stage followed by the subsequent stage and a corresponding threshold.

15. The method of claim 13, further comprising:
   determining the detection result of the subsequent stage as the detection value of the target image in response to the detection value of the first stage being greater than the threshold; and
   determining the detection value of the first stage as the detection value of the target image in response to the detection value of the first stage being less than the threshold.

16. The method of claim 1, wherein the determining whether the target in the target image is the true target based on the detection value of the target image comprises:
   determining a blur evaluation value of a current frame in response to the target image being the current frame in a frame image;
   determining a collective detection value of the target image based on the blur evaluation value of the current frame, a detection value of the current frame, blur evaluation values of previous frames in the frame image, and detection values of the previous frames; and determining whether a target in the current frame is the true target based on the collective detection value of the target image.

17. The method of claim 16, wherein the determining of the blur evaluation value comprises:
calculating the blur evaluation value based on blur probabilities of edge pixels in the current frame.

18. The method of claim 16, wherein the determining of the collective detection value of the target image comprises:
determining a weighted average value of detection values by using each of the blur evaluation values of the current frame and the previous frames as a weight of a corresponding detection value, and determining the weighted average value as the collective detection value.

19. The method of claim 1, further comprising a training method based on the quality type of the sample image, the convolutional neural network of the quality type, and the detection value of the target image.

20. A non-transitory computer-readable storage medium storing instructions that, when executed by a processor in a terminal, cause the processor to perform the method of claim 1.

21. A processor implemented method of training a convolutional neural network, the method comprising:
determining a quality type of a sample image from among a plurality of qualityy types;
selecting a convolutional neural network of a quality type corresponding to the determined quality type of the sample image from among quality types of convolutional neural networks; and
training the selected convolutional neural network of the quality type based on whether the sample image is a true sample or a false sample.

22. The method of claim 21, wherein the sample image corresponds to the true sample in response to the sample image comprising a true target, and the sample image corresponds to the false sample in response the sample image not including the true target.

23. The method of claim 21, wherein the quality type of the sample image is determined, from among the plurality of quality types, based on at least one quality value of the sample image that is determined in correspondence to at least one quality parameter.

24. The method of claim 21, wherein the determining of the quality type of the sample image comprises:
determining at least one quality value of the sample image in correspondence to at least one quality parameter;
determining at least one quality classification of the sample image based on the at least one quality value and at least one quality type classification standard that is preset in correspondence to the at least one quality parameter; and
determining the quality type of the sample image based on the at least one quality classification.

25. The method of claim 21, further comprising:
constructing a database based on the convolutional neural network of each quality type.

26. The method of claim 21, wherein the convolutional neural network comprises a cascaded convolutional neural network that comprises at least two convolutional neural networks and at least one threshold determining layer.

27. The method of claim 26, wherein the cascaded convolutional neural network of each quality type requires a different performance index, and a number of stages included in the cascaded convolutional neural network of each quality type is determined based on a corresponding performance index.

28. A target detection apparatus, comprising:
a processor configured to:
determine a quality type of a target image from among a plurality of quality types;
determine a convolutional neural network of a quality type corresponding to the quality type of the target image by referring to a database comprising convolutional neural networks;
determine a detection value of the target image based on the convolutional neural network of the corresponding quality type; and
determine whether a target in the target image is a true target based on the detection value of the target image.

29. The target detection apparatus of claim 28, further comprising a memory configured to store instructions, wherein the processor is further configured to execute the instructions to configure the processor to perform the:
determination of the quality type from among the plurality of quality types;
determination of the convolutional neural network of the quality type corresponding to the quality type of the target image by referring to the database comprising the convolutional neural networks;
determination of the detection value of the target image based on the convolutional neural network of the corresponding quality type; and
determination of whether the target in the target image is the true target based on the detection value of the target image.

30. The target detection apparatus of claim 28, wherein the convolutional neural network comprises a cascaded convolutional neural network that comprises convolutional neural networks of at least two stages and at least one threshold determining layer.

31. The target detection apparatus of claim 30, wherein the cascaded convolutional neural network of each quality type requires a different performance index, and a number of stages included in the cascaded convolutional neural network of each quality type is determined based on a corresponding performance index.

32. The target detection apparatus of claim 30, wherein, to determine the detection value of the target image, the processor is configured to:
determine a detection value of a first stage of the target image based on a convolutional neural network of a first stage included in the cascaded convolutional neural network; and
perform a process of determining a detection value of a subsequent stage of the target image by comparing the detection value of the first stage and a preset threshold based on a threshold determining layer connected to the convolutional neural network of the first stage.

33. The target detection apparatus of claim 28, wherein, to determine whether the target in the target image is the true target, the processor is configured to:
determine a blur evaluation value of a current frame in response to the target image being the current frame in a frame image;
determine a collective detection value of the target image based on the blur evaluation value of the current frame, a detection value of the current frame, blur evaluation values of previous frames in the frame image, and detection values of the previous frames; and determine whether a target in the current frame is the true target based on the collective detection value of the target image.

\* \* \* \* \*